March 3, 1942.    W. R. ELSEY    2,274,679
REFRIGERATOR CAR
Filed July 12, 1941    8 Sheets-Sheet 3
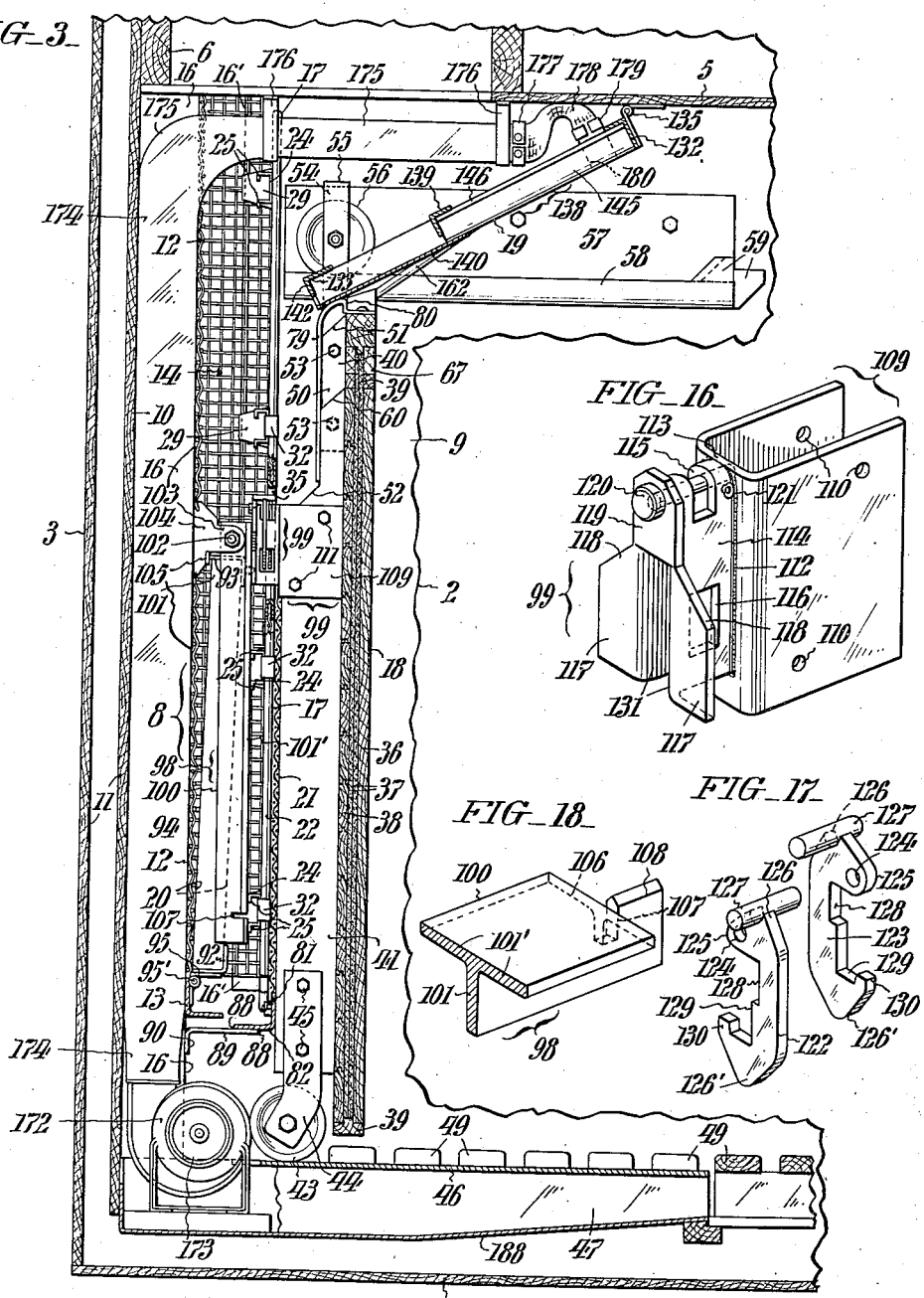
WITNESSES:
Hubert Fuchs
Woodrow Stevenson
INVENTOR:
Warren R. Elsey,
BY Paul & Paul
ATTORNEYS.

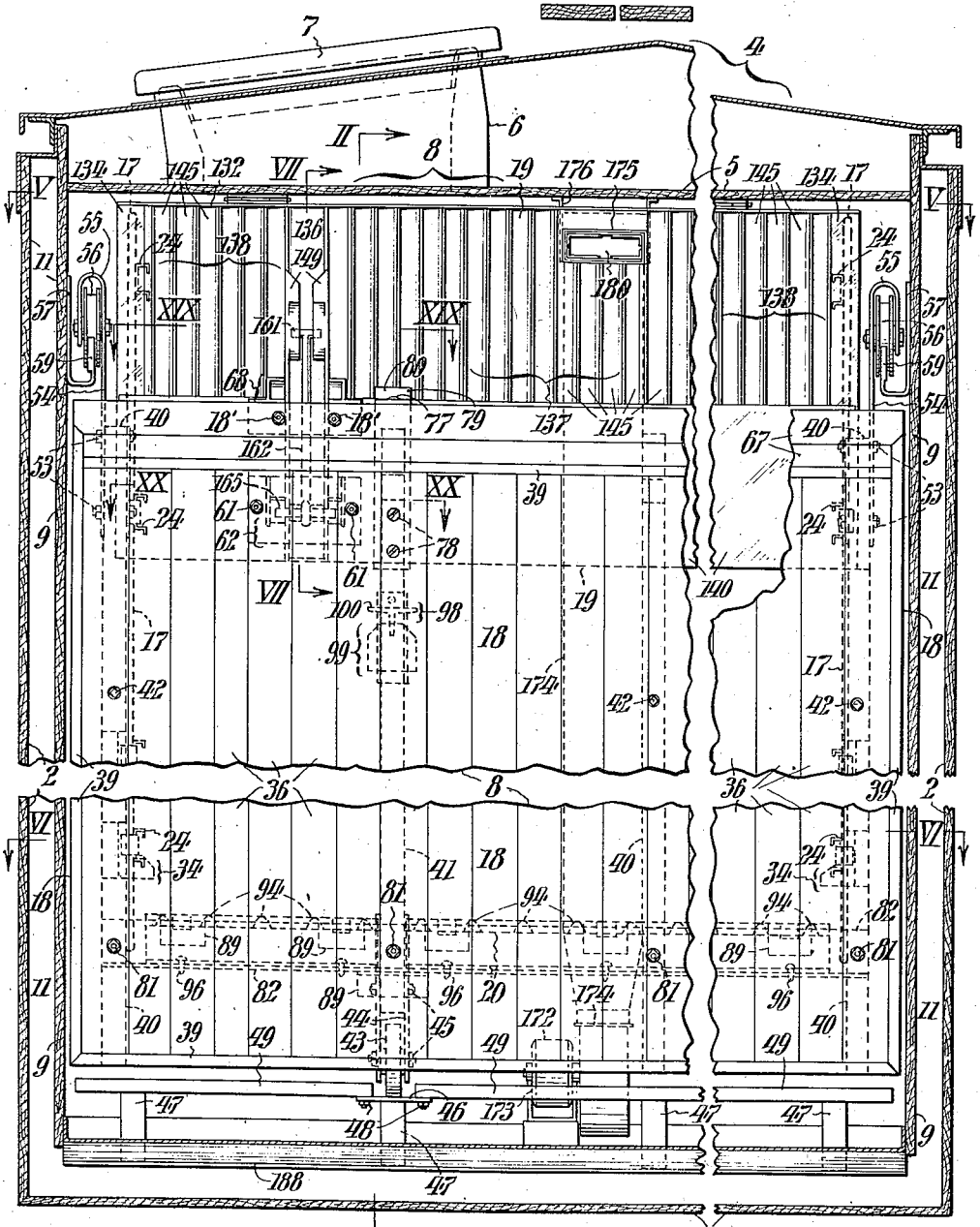

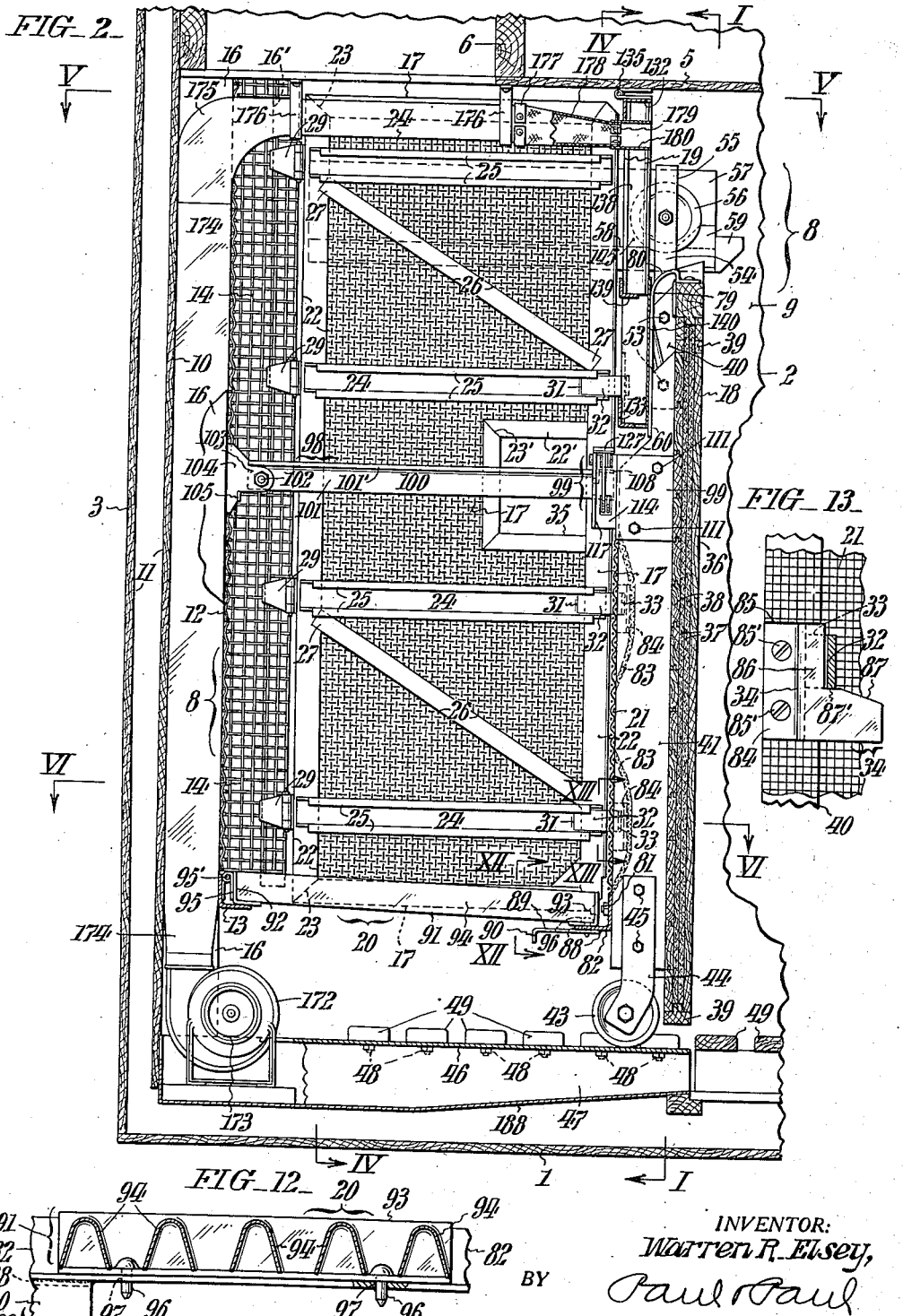

March 3, 1942.   W. R. ELSEY   2,274,679
REFRIGERATOR CAR
Filed July 12, 1941   8 Sheets-Sheet 4
FIG_4
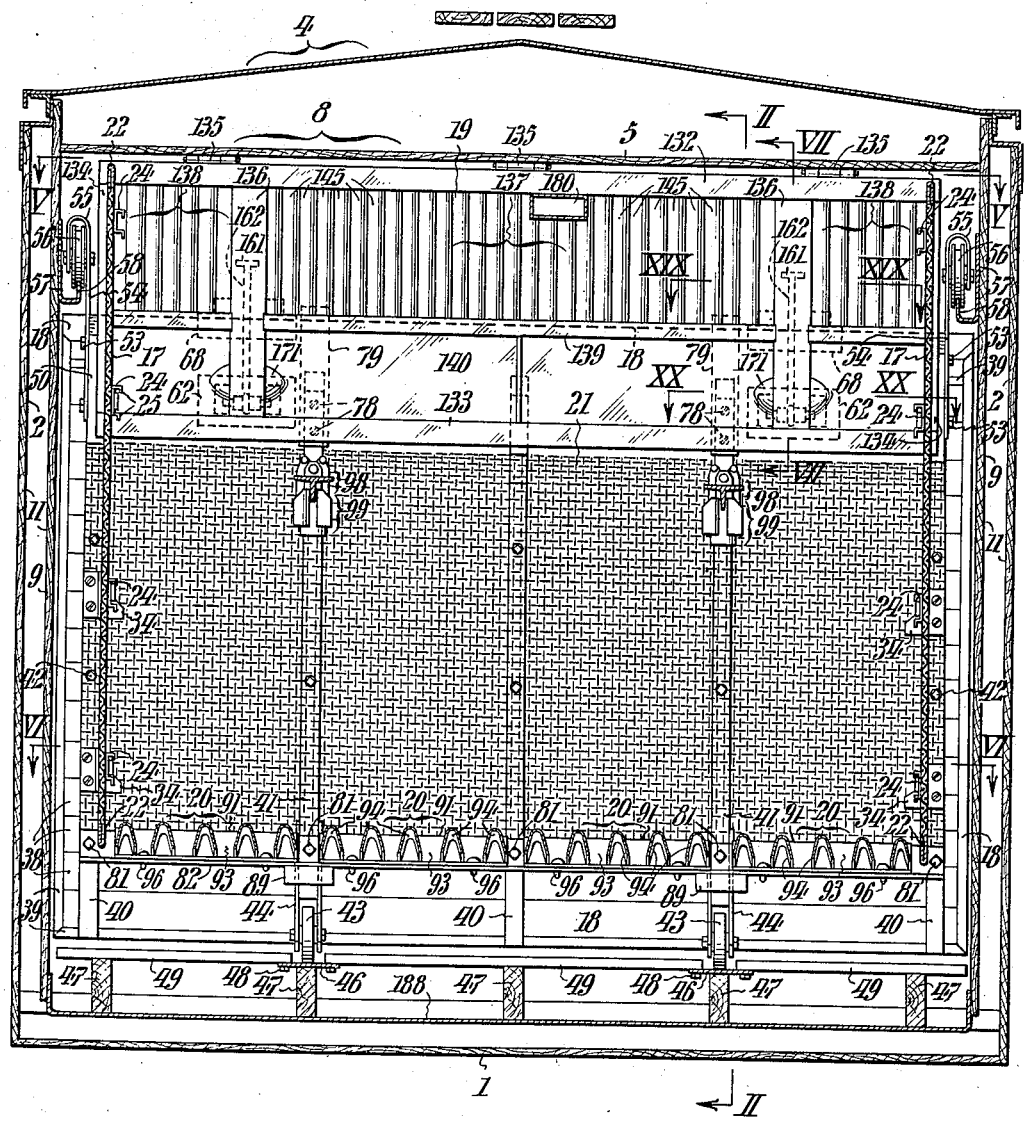
WITNESSES:
Hubert Fuchs
Woodrow Stevenson
INVENTOR:
Warren R. Elsey,
BY Paul & Paul
ATTORNEYS.

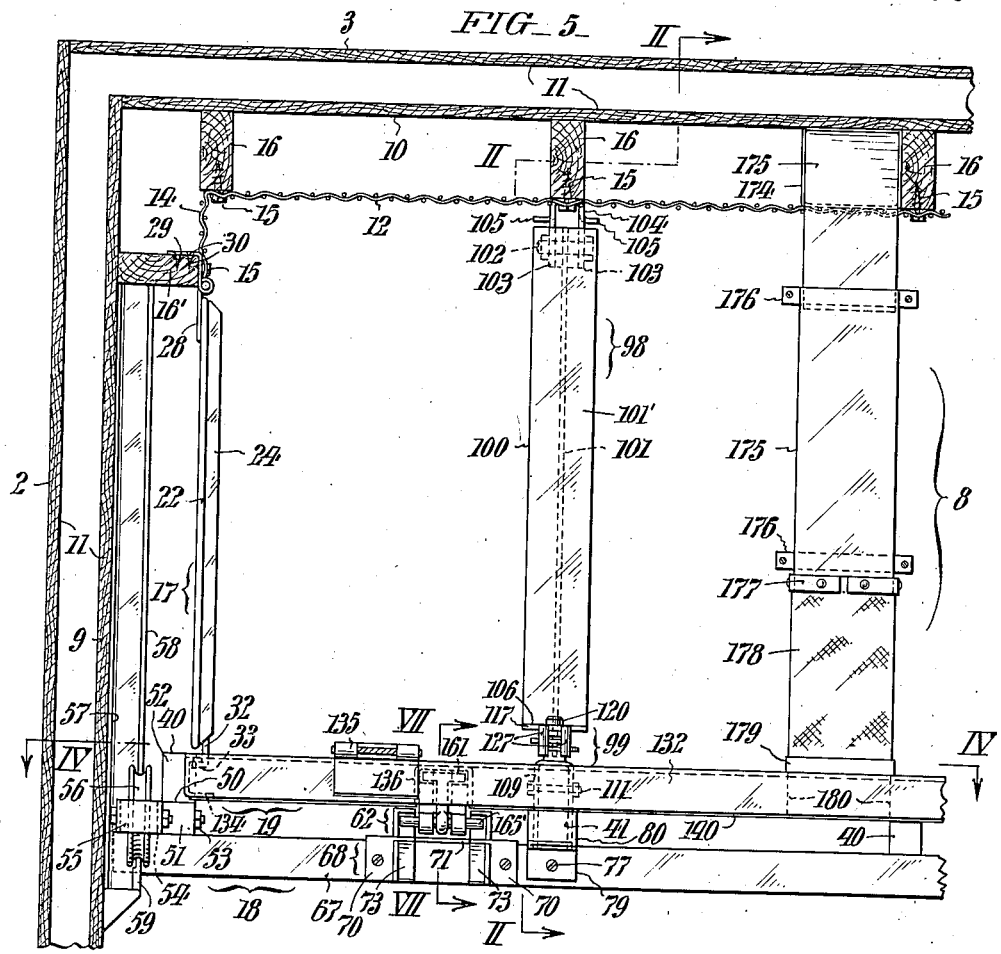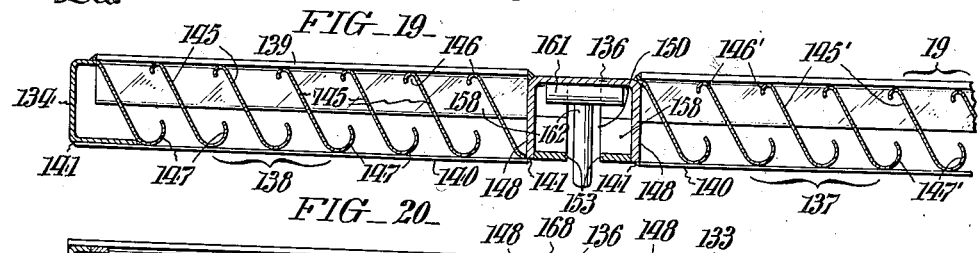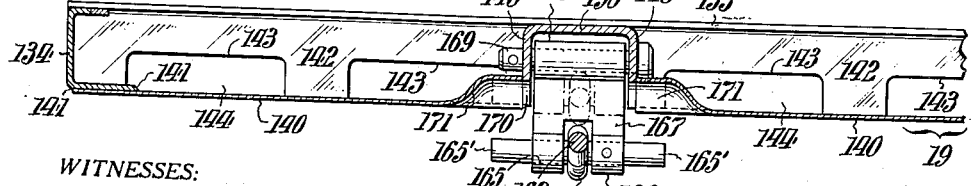

March 3, 1942.  W. R. ELSEY  2,274,679
REFRIGERATOR CAR
Filed July 12, 1941    8 Sheets-Sheet 6
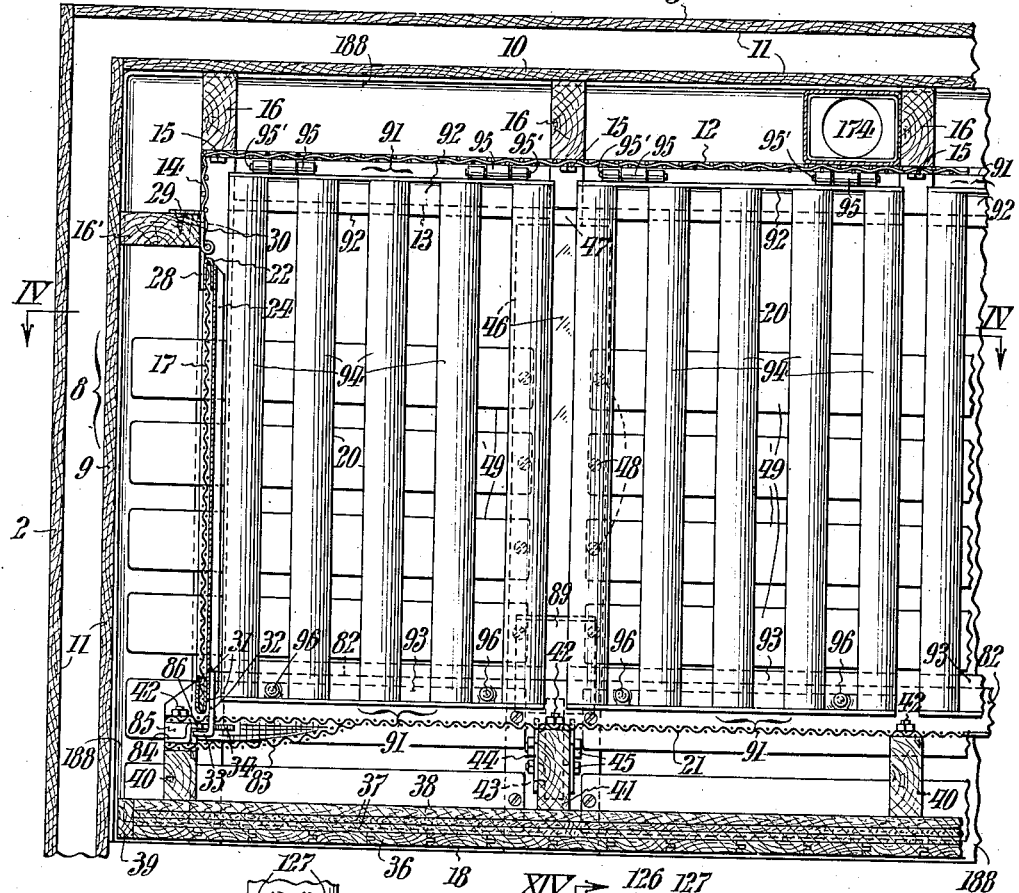
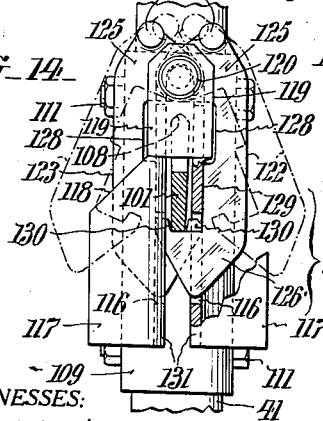
WITNESSES:
Hubert Fuchs
Woodrow Stevenson
INVENTOR:
Warren R. Elsey,
BY Paul & Paul
ATTORNEYS.

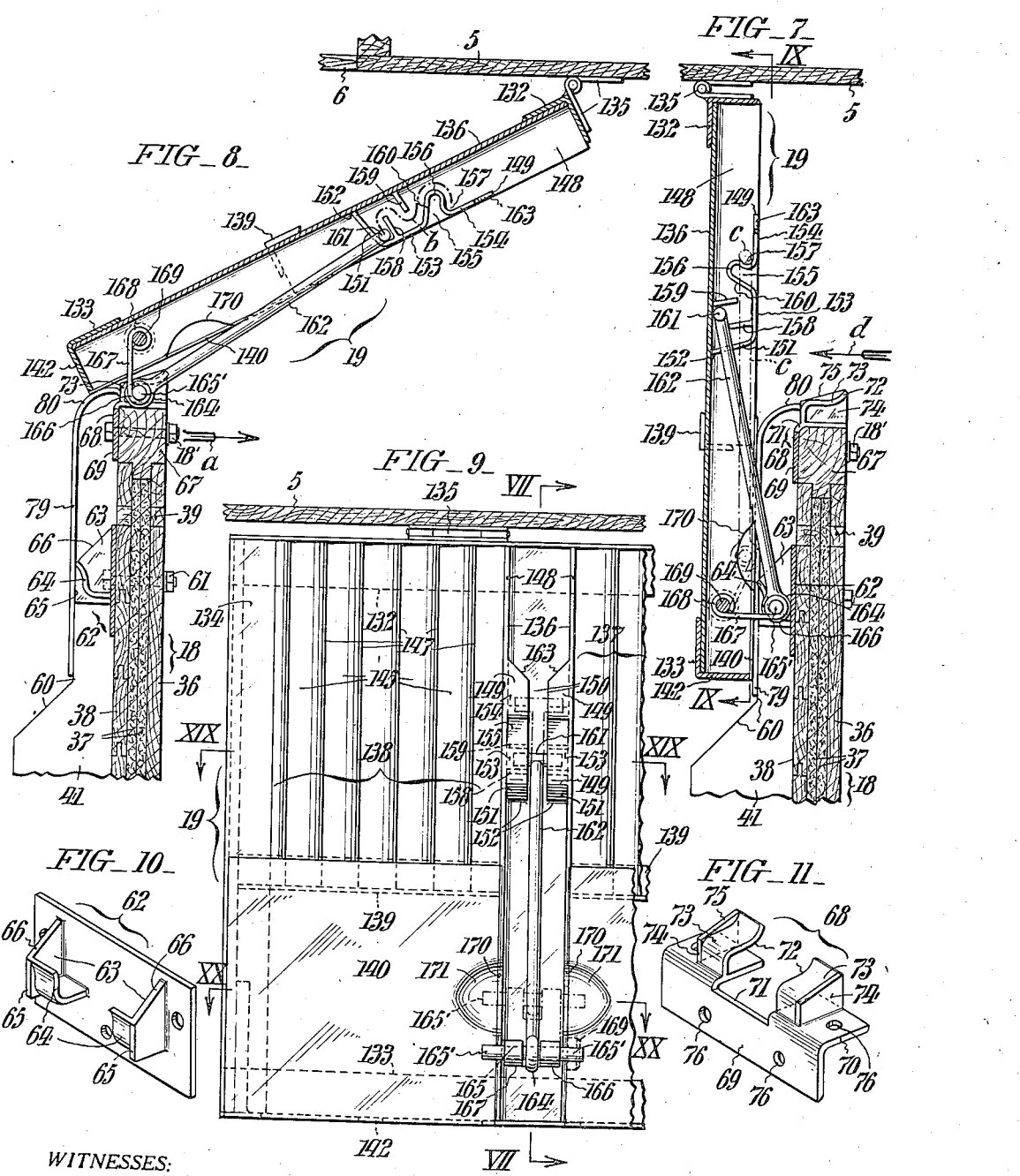

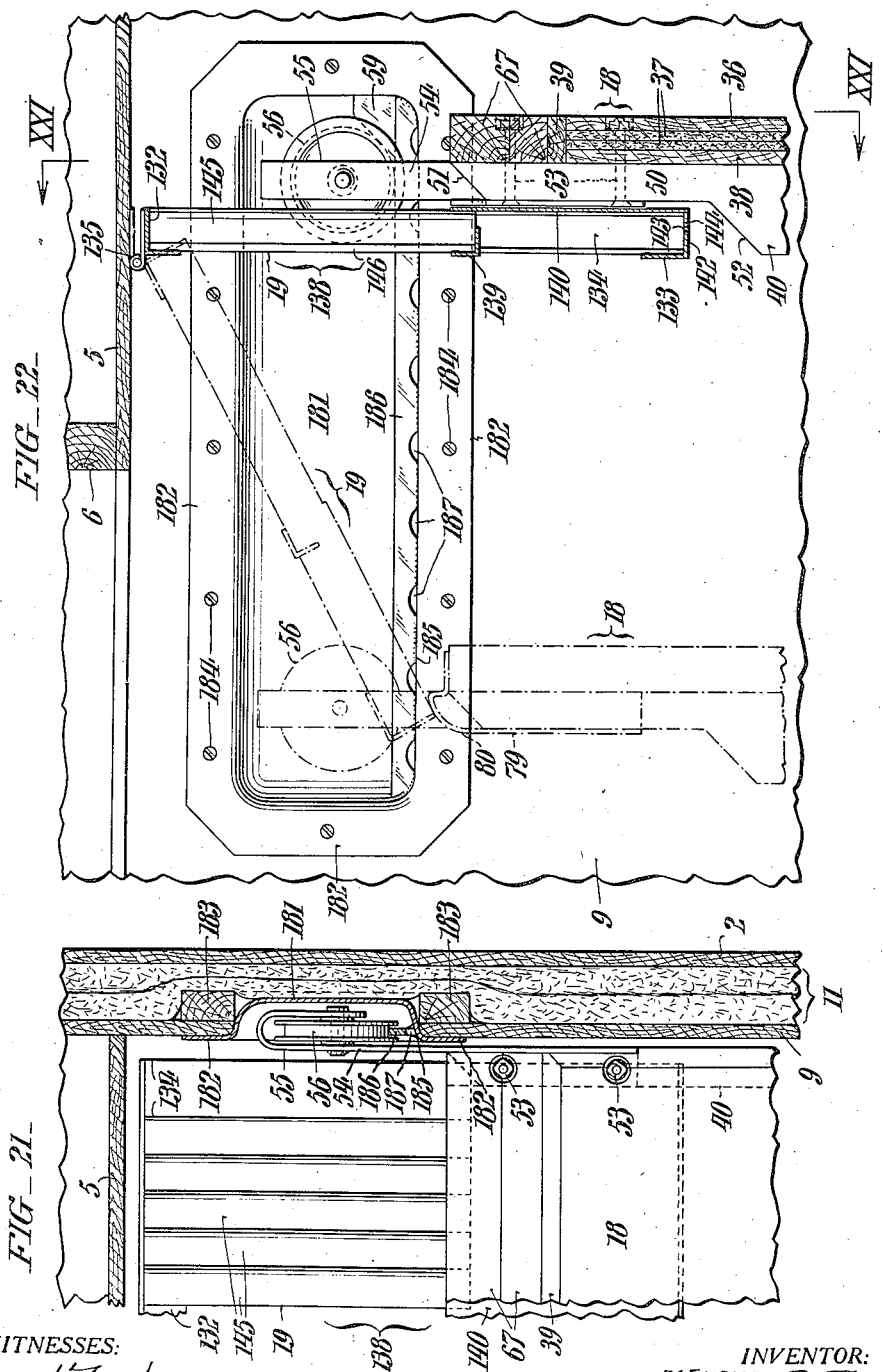

Patented Mar. 3, 1942

2,274,679

UNITED STATES PATENT OFFICE 2,274,679

REFRIGERATOR CAR

Warren R. Elsey, Wynnewood, Pa., assignor to The Pennsylvania Railroad Company, Philadelphia, Pa., a corporation of Pennsylvania Application July 12, 1941, Serial No. 402,133

19 Claims. (Cl. 62—19)

This invention has reference to refrigerator cars and, more particularly, to the species including collapsible bunkers for reception of ice, such bunkers when collapsed towards the car ends leaving the interior wholly free for lading.

The primary aim of this invention is to provide a construction and arrangement of shiftable bulkhead having an associated swinging cinder deflector and novel means for locking the latter to said bulkhead when collapsed, or in extended bunker forming location.

Another aim of this invention is to provide an improved structural form of collapsible bunker whereby ease in movement, from the collapsed position to active location for reception of ice is enhanced, and vice versa.

A further aim is to improve the air circulation through the ice bunker while at the same time providing a bunker construction, the several parts whereof are all arranged and coordinated to withstand rough usage without impairing any of the relatively movable parts.

While the foregoing definitions are indicative, in a general way, of the aims of this invention, subsidiary objects with ancillary advantages will be later on set forth; while it will be evident to those skilled in the art upon a full understanding of the construction, arrangement and operation of the means hereinafter fully disclosed, that various changes are contemplated: and that said invention is susceptible of other combinations or structurally modified forms than the species chosen for illustration in the accompanying sheets of drawings which show a preferred embodiment, and wherein like reference characters designate corresponding parts in all the views; whereas the concluding claims more particularly recite the features of novelty over the prior art.

In the drawings:

Fig. 1 is a broken transverse section through a refrigerator car body equipped with a preferred form of collapsible ice bunker forced circulation arrangement, in accordance with this invention, said section being taken approximately on the plane designated by the angle-arrows I—I in Fig. 2.

Fig. 2 is a broken longitudinal section on the plane II—II in Figs. 1, 4 and 5, with the ice bunker expanded or in active position.

Fig. 3 is a similar section to the preceding with the several parts of the ice bunker in a different position or collapsed relative to the adjoining end wall of the car body.

Fig. 4 is a transverse section taken approximately as indicated by the angle-arrows IV—IV in Figs. 2, 5 and 6.

Fig. 5 is a fragmentary plan section taken as designated by the angle-arrows V—V in Figs. 1, 2 and 4.

Fig. 6 is a fragmentary section on the horizontal plane indicated by the angle-arrows VI—VI in Figs. 1, 2 and 4.

Fig. 7 is a detail section, drawn to larger scale, through the cinder deflector and upper portion of the bunker bulkhead in coactive relation, or as viewed on the plane designated by the angle-arrows VII—VII in Figs. 1, 4, 5 and 9.

Fig. 8 is a similar section to the preceding with the bulkhead in a different position or inactive, whereas the deflector is located to effectively prevent tampering with the car lading by way of the hatch.

Fig. 9 is a cross-section taken on the plane indicated by the angle-arrows IX—IX in Fig. 7.

Fig. 10 is a perspective view of a latch device for arresting the cinder deflector in coactive relation with respect to the bulkhead.

Fig. 11 is a perspective view of another latch device effective to secure the cinder deflector elevated or when the bunker bulkhead is collapsed with respect to the adjoining car end.

Fig. 12, Sheet 2, is a fragmentary section through the ice grate or bottom component of the bunker, taken as indicated by the angle-arrows XII—XII in Fig. 2, and drawn to larger scale for clearer illustration of important details.

Fig. 13, Sheet 2, is a fragmentary section of a preferable means for latching the bunker side walls in coactive relation to the bulkhead, as hereinafter fully explained, said section being taken approximately on the plane XIII—XIII in Fig. 2 and drawn to larger scale for clearer illustration of the details.

Fig. 14, Sheet 6, is an end view, with a part broken out and others in section, of a bulkhead spacer bar and automatic latch assembly, later on fully described, said view being taken approximately as indicated by the angle-arrows XIV—XIV in Fig. 15.

Fig. 15 is a side elevation of the preceding figure, or as viewed from the right-hand thereof.

Fig. 16, Sheet 3, is a perspective view of a bracket included in the latch assembly of Figs. 14 and 15.

Fig. 17 is an exploded perspective view of right- and left-hand hooks included in the latch assembly.

Fig. 18 is a fragmentary perspective view of the spacer bar latch engaging end, or that portion shown by combined full and dotted outline in the left-hand mid-portion of Fig. 15.

Fig. 19, Sheet 5, is a fragmentary section through the cinder deflector, said section being taken approximately as indicated by the angle-arrows XIX—XIX in Figs. 1, 4 and 9, and drawn to larger scale for clear illustration of the details.

Fig. 20 is a similar scale section on the plane XX—XX in Figs. 1, 4 and 9, or through another portion of the cinder deflector.

Fig. 21 is a part section and part elevation of a modified form of bulkhead trolley track hereinafter fully explained, said figure being taken approximately as indicated by the angle-arrows XXI—XXI in Fig. 22; and, Fig. 22 is a face elevation of the same, or as viewed from the left-hand of Fig. 21.

In describing the form of this invention exemplified by the above captioned drawings, specific terms will be employed for the sake of clarity, but it is to be expressly understood the scope of said invention is not thereby limited; each such term being intended to embrace all reasonable equivalents which perform the same function for an analogous purpose.

Referring more in detail to the drawings, it is to be remarked that while the invention herein disclosed is described as more particularly adapted for refrigerator cars, it is by no means thereby restricted; and it will be apparent from the following explanation that by readily discernible changes it is equally applicable to various other refrigerating systems using ice as the cooling medium.

In the form of embodiment shown herein, a conventional refrigerator car body is illustrated in transverse section, the same comprising a floor 1, side walls 2, and one of the end walls 3; while the outer roof is comprehensively designated 4 and the inner roof or ceiling 5; whereas one of the hatches is indicated by the reference 6, said hatch having a removable cover 7 whereby provision is afforded for loading ice into the novel collapsible bunker 8 of this invention. The side and end lining walls are characterized 9 and 10, respectively, the same affording the customary insulation space 11; while all of the said parts, with the exception of the bunker 8, are of conventional construction and are merely referred to for ease in better explaining this invention.

The collapsible bunker 8 generally comprises a stationary end wall or reticulate component 12 conveniently extending from the car ceiling 5 downwards into abutment with a transverse angle-section 13, said component having the vertical side edges inwardly angled at 14, Figs. 5 and 6, means such as screw bolts 15 serving to firmly attach the basket component 12 to vertical posts 16 provided for the purpose in the car end. The bunker 8 also includes inwardly foldable counterpart side walls 17, a movable bulkhead 18, a vertically swingable cinder deflector 19, a similarly foldable bottom or ice grate 20, and an inner basket component 21 carried by and in spacial relation to the bulkhead 18, said side walls 17 and basket component 21 being, preferably, also of material corresponding with that of the component 12 and jointly affording, in conjunction with the grate 20, a container or basket for the ice, not shown.

With more particularity, each side wall 17 is surrounded by a frame of retroverted sheet metal binding strip 22, united at the corners by diagonal welds 23, and reinforced on the inner surface by spaced transverse braces 24, preferably of channel-section with the flanges unidirectionally or downwardly bent to provide coplanarly related anglings 25, to stiffen the same, while said braces are conveniently seam welded at their ends to the confronting surfaces of the strip 22, in an obvious manner. In addition, each side wall 17 is further rigidified by cross braces 26, of flat metal strip, having their diagonally related angular corners 27 welded to the strip 22, as clearly understandable on an examination of the drawings. The basket side walls 17 are each mounted for inward folding movement by means of hinges having one leaf 28 edge welded to the confronting outer face of the binding strip 22, while the other leaf 29 is appropriately angled for rigid attachment to the adjoining vertical post 16', as by screws 30 for instance (Figs. 5 and 6). Each transverse brace 24, with the exception of the top one, at the end remote from the hinges 28, 29 has secured thereto, by welds 31, Fig. 6, a retainer element 32 having the free end outwardly angled at 33 for coaction with an associated latch device 34, carried by the movable bulkhead 18, and later on fully explained. Each side wall 17 is further provided with a cut-out 35, having applied strip 22', for stiffening purposes, and the function whereof will also be later on clarified.

Referring now to the bulkhead 18, as shown in Figs. 1–6, the solid portion which faces the ice container or collapsible bunker 8, is substantially of conventional construction; that is to say it includes a tongue-and-groove facing 36, appropriate insulation 37, tongue-and-groove lining 38, and a surrounding frame 39, with spaced vertical stiffeners 40 and posts 41 rigidly clamped to the solid portion by carriage bolts 42. The bulkhead 18 is supported for movement, toward and away from the car end walls 3, 10, on rollers 43, journaled in somewhat H-section bearings 44 rigidly clamped to the lower end portions of the posts 41 by through bolts 45. The rollers 43 are arranged for progression along tracks 46, in turn sustained by spaced floor beams 47, while said tracks are also attached by bolts 48 to the car flooring 49 which, it will be observed from Figs. 2–4 more particularly, is cut-out in the region below the bunker 8 for free passage of the rollers 43 along the said tracks 46. The upper portions of the stiffeners 40, as best understood from Fig. 3, are vertically reduced at 50 and beveled off at 51, 52, and to the outer sides of such reduced parts 50 there is respectively attached, as by bolts 53, the longer leg 54 of an inverted stirrup member 55, affording rotary bearing for trolley wheel 56, adapted for progression along a related track 57 of hook cross-section or, more specifically expressed, said track consists of a metal plate having the lower edge turned upwards to define a rail portion 58 with which the wheel 56 coacts. It is to be noted the rail portions 58 at their ends remote from the car walls 3, 10 are fitted with stops in the form of abutment pieces 59 conveniently attached thereto by welding; also that the respective tracks 57 are attached to the car side walls 2, 9 as by lag screws, not shown, or other appropriate means.

The respective posts 41 have their upper ends located below the adjacent portion of the frame 39, and are reduced as indicated by the reference 60, similar to the stiffeners 40. Attached by through bolts 61 to the bulkhead 18 and below the upper edge thereof is a locking device component 62, which is shown to best advantage in Fig. 10, Sheet 7, as embodying spaced projecting pockets 63 with undulate front walls 64 and outer side walls 65 having the upper edges 66 preferably inclined.

The top of the bulkhead frame 39 is preferably strengthened by a coextending beam 67, appropriately secured thereto, and to the latter there are attached other locking device components 68 in vertical alignment with the components 62, aforesaid, and one of which is shown in Fig. 11. It will be seen from Fig. 11 that each component 68 is, preferably, in the form of an angle-section to include a vertical flange 69 and a horizontal flange 70, with an intermediate cut out 71 in the latter flange. Integral with the horizontal flange 70 are upwardly directed open-side pockets 72, each embodying an undulate wall 73 and a side wall 74 having the upper edges 75 inclined downwardly relative to the horizontal and rearwards with respect to the plane of the facing 36 of the bulkhead 18. The locking component 68, it will be readily understood, is secured in position as by bolts 18', Fig. 1, and wood screws—not shown—engaged through holes 76 in the respective flanges 69, 70. In spacial relation to the inner side of each locking component 68, with attachment to the top beam 67 of the bulkhead 18 and to posts 41, by screws 77 and through bolts 78, Fig. 1, is a runner 79 having an arcual portion 80 extending beyond the top edge of said bulkhead, for a purpose later explained. In addition to the foregoing adjuncts of the bulkhead 18, it is to be particularly remarked there is attached, by bolts 81, Figs. 1–3, across the stiffeners 40 and posts 41 as well as in spaced relation to their lower extremities, a transverse angle bar 82. Intermediate the upper or vertical flange edge of the bar 82 and the level of the cut-outs 35 in the side walls 17 is applied the reticulate component 21, hereinbefore referred to, said component being conveniently held in place by stapling as clearly understandable from Fig. 6 more particularly: while it is observable the component 21, in the region of the respective latch devices 34, is outwardly expanded, as indicated at 83, Figs. 2 and 6 more particularly, for reasons now to be explained. Each of the latch devices 34, hereinbefore referred to and best understood from Figs. 6 and 13, is of Z-section considered horizontally, or embodies an attaching flange 84 for securement in a notch 85 in the stiffener 40 by screws 85' engaged through the confronting expanded portion 83 of the component 21. The other flange 86 of the latch device 34 is laterally extended and inclined at 87, Fig. 13, to define a guide for the associated side wall retainer element 32, the angled outer end 33 whereof passes behind the upper portion of the flange 86 when the bunker 8 is in the active position, as further on amplified. Rigidly affixed to the transverse angle bar 82, as by welds 88, are outwardly projecting elements 89 having their free ends 90 downwardly turned for service as stops when the bunker 8 is collapsed, by abutment against the car end posts 16.

Referring now to the upwardly foldable ice grate 20, and as best understood from Figs. 2, 6 and 12, said grate comprises laterally separate sections 91, each of which includes outer and inner or opposed angle-sections 92, 93 with rectangularly related intervening and rigidly connected invert trough-like spaced bars 94 seated on the horizontal flanges of said sections, see Figs. 2 and 12. The several sections 91 afford bottom support for the ice, when the bunker 8 is in active position; and each section 91 is foldably attached to the vertical flange of the hereinbefore identified transverse angle-section 13 by hinges 95, the respective leaves whereof are preferably welded to said vertical flange and the angle-section 92, as clearly understandable on inspection of Fig. 2. It is to be here noted that, when the grate 20 is in use, the horizontal flange of the angle-section 92 seats on the correspondingly directed flange of the angle-section 13; while the complemental parts of the angle-section 93 and angle bar 82 similarly coact in order to provide proper support for the grate 20 and to relieve the hinge pins 95', Figs. 2 and 6, from strain. At convenient points along the horizontal flange of each angle-section 93 are rigidly secured pins or studs 96 for engagement in registering holes 97 provided for their reception in the horizontal flange of the angle bar 82; said studs 96 serving to effectively resist the thrust of the car lading against the bulkhead 18.

In order to retain the bulkhead 18 in proper assembly when the bunker 8 is expanded or in active position, use is made of the means now to be described, said means preferably comprising spacers and automatic latches which are comprehensively designated 98, 99, respectively. Each spacer 98 is preferably in the form of a T-section bar 100, Figs. 1–5 and 18, whereof the outer portion of the stem 101 is fulcrumed by a pivot 102 to the laterally projecting apertured ears 103 of a channel-section bracket 104 embodying flanking tabs 105, and attached by one of the screw bolts 15 to selected car posts 16; while it is to be noted the spacer end cross-section, when in active position, seats snugly across the top flat edges of the apertured ears 103, while the outer edges of said ears are rounded, as best shown in Figs. 2 and 3, to permit the flange portion to ride smoothly thereover when the spacer 98 is moved to the position shown by the last mentioned figure. The relatively remote or free end of the spacer bar 100, see Fig. 18, has the flange portion cut away at 106, and the stem 101 notched at 107 with the relatively outboard part beveled at 108 for reasons hereafter explained.

The automatic latch 99 as best shown in Figs. 2–5, 16 and 17, comprises a channel-section bracket 109 with axially aligned holes 110 through the flange portions, for passage of bolts 111, whereby it is attached to the associated vertical post 41 of the bulkhead 18, in an obvious manner. United as by line welds 112 to outer vertical face of the bracket web portion 113, Fig. 16, is a retrovert or stirrup member 114 having the rounded portion transversely cut-out at 115, and the respective leg portions provided with opposing rectangular apertures 116. Attached to, or forming a part of, the stirrup member 114 are coplanar flanking flanges 117 having the upper edges inclined at 118 or merging to a closure section 119 for the upper part of said stirrup member. Supported by axially aligned holes through the closure section 119 and web 113 of the bracket 109, and engaging the curve of the stirrup member 114, is a headed fulcrum member 120 conveniently restrained against rotation or accidental dislodgment by a cotter pin 121 in an obvious manner, see Figs. 14 and 15 to best advantage. The fulcrum member 120 in turn affords pendulous support for right- and left-hand, or counteractive, latch hooks 122, 123, Fig. 17, by passage through apertures 124 in laterally projecting ears 125 thereof; each said hook embodying an elongate main portion with upper and lower taper ends 126, 126', respectively; the former 126 of which includes the apertured ear 125, and a cross arm or finger grip 127 over the apex section thereof. It is to be noted, the pivots or apertures 124 of the latch hooks 122, 123 are respectively to the left- and right-hand of the longitudinal medians thereof, as viewed in Figs. 14 and 17, while the lower tapers 126' are similarly disposed, so that said hooks normally tend to occupy the full-line position of Fig. 14. Each hook 122, 123 further includes an upper rectangular cut-out 128 having the inner edge paralleling the longitudinal median to one hand and a lower cut-out 129 having its inner edge similarly directed to the other hand of said median; while said lower cut-out is provided with an upwardly directed latching toe 130. It is to be observed the flanking flanges 117 of the bracket 109, have their inner vertical portions preferably rounded at 131.

Turning now to the cinder deflector 19, Figs. 1–4, 7–9, 19 and 20, the same comprises upper and lower angle-section elements 132, 133, respectively, with permanently united side members 134 of irregular channel-section, jointly providing a rigid frame having hinges 135 attached to the element 132 and the car ceiling 5, whereby said deflector is movable up and down by the bulkhead runner arcual portions 80, when the bulkhead 18 is moved towards or away from the car end walls 3, 10. The rigid frame 132—134 is subdivided by interposed channels 136 for housing latching means, later on described, and to set apart a main louver-section 137 with comparatively narrow side louver-sections 138; while aligned intermediate transverse angle-sections 139 separate the frame aforesaid into upper and lower portions, the latter of which are closed in by coplanar plates 140. These plates 140 are preferably secured to the flange edges of the channels 136, the lapping edges of the side members 134 and registering edge of the lower frame-section element 133, by seam welds 141, all as readily understandable by those conversant with the art. It is also to be noted that the outboard flange 142 of the angle-section element 133 includes spaced cut-outs 143, defining with the confronting edge portions of the plates 140 elongate apertures 144, the purpose whereof is hereafter set forth.

Permanently secured in each of the deflector louver-sections 138, as by welding at their ends to the frame elements 132 and the angle-sections 139, are inclined slats 145 having the longitudinal edges reversely troughed to differential cross-section at 146, 147; the smaller troughings 146 being outward, or upward, relative to the general plane of the deflector 19 and spacially overlying the larger troughings 147. Referring again to the interposed channels 136, it will be observed they have their flanges 148 confrontingly directed relative to the top beam 67 of the bulkhead 18 and, at a determinate position lengthwise thereof, there are fixedly secured between said flanges opposing members 149 defining an intervening clearance 150, seen to best advantage in Fig. 9. Each opposing member 149, see Figs. 7 and 8, preferably consists of a strip shaped to define an obtuse angled end 151, for attachment by welds 152 to the web of channel 136, spaced sections 153, 154 for similar securement coplanarly along the outer edges of the flanges 148 with an intervening corrugate recess 155, said recess forming a hump 156 and a merging groove 157. Transversely of the guide member section 153 is rigidly secured an inwardly directed inclined stop 158, flaringly disposed with respect to the confronting guide member end 151; while spacedly related and outwardly of the stop 158 is a complemental stop 159 fixedly secured to the web of the channel 136 intermediate the flanges 148 thereof, said stop 159 being planarly inclined substantially parallel with the angular inclination of the guide member end 151. In other words, it will be observed that the opposingly related stops 158, 159 in conjunction with the guide member end 151, and the confrontingly related flat-section 160 of the keeper 153, define a zig-zag pathway for operative guidance of the cross arm 161 of an arrestor rod 162; while it is to be remarked the outer ends of the guide members 149 are preferably inclined at 163 for initial entrance of the cross arm 161. The arrestor rod 162 is preferably of round-section bar stock and is provided with an eye 164 at the end remote from the cross arm 161. Coupled to the eye 164, by a through pin 165, is the fork end 166 of a locking component 167, said pin being rigidly fixed in the fork with extension therebeyond, at each side, to provide lateral projections 165' for joint coaction with the pocket portions 63 and 73 of the respective locking components 62 and 68 hereinbefore referred to and later on fully explained. The remote tubulate end 168 of the arrestor member 167, in turn, is pivotally connected to a bearer pin 169 engaging therethrough and rigidly secured transversely across the flanges 148 of the associated channel 136. It is to be particularly observed that the flanges 148 are arcually recessed at 170, with the regionally adjoining parts of the flanking plates 140 locally indented to afford opposing pocket clearance 171 for the laterally projecting pintle portions of the through pin 165, during movement of the cinder deflector 19, as further on fully clarified.

In order that air may be circulated through the bunker 8 when in active position, use is made of a suitable rotary fan 172, Figs. 1–3 and 5, operatively coordinated with any convenient source of power, not shown; said blower being preferably located so that the intake 173 thereof is at or near the level of the car flooring 49 for ingress of ambient air and its recirculation about the car lading. The outflow air duct 174 extends vertically of the adjoining car end wall 10; and has fitted to the upper end a reducer elbow 175, conveniently supported from the car ceiling 5, by hanger straps 176. At the reduced end of the elbow 175 there is attached, by clamp means 177, a tapering flexible extension 178, in turn secured by attaching means 179, to the adjoining end of a short duct 180, interposed in and rigidly sustained by the cinder deflector 19, whereby provision is afforded for free passage of cold air through the duct 174 from the bottom of the ice bunker 8, where it settles by convection, upward and over, and thence downwardly about the lading or freight, under forced reverse circulation, when said bunker is in service position.

Referring now to Figs. 21 and 22, which show a modified form of bulkhead trolley means, all parts having equivalents in the preceding description are identified by corresponding reference characters to avoid unnecessary repetitive description. It is to be noted, however, this modified trolley means enables lateral location of the bulkhead side stiffeners 40 in alignment with the vertical edges of the bulkhead 18, with corresponding increase in the transverse width of the cinder deflector 19, as well as better determination of the air channel with respect to the adjoining car wall; and also more effectively preventing theft being carried out by way of the hatch 6 and bunker 8. As readily understandable from Figs. 21 and 22, instead of the trolley tracks 57, hereinbefore described in connection with Figs. 1–19, use is preferably made of a substantially rectiform comparatively thin dished track support 181 having a surrounding flange 182, said bearing being adapted for attachment in a complemental aperture provided through the bulkhead lining 9, and reinforced by an inner framing 183. This dished bearing 181 is conveniently held in place by conventional screws 184 passed through holes in the flange 182 and engaged in the lining 9 and said framing 183. Lengthwise of the lower longitudinal wall portion of the dished bearing 181, there is preferably fixed, by welds 185, a vertically directed rail member 186, having, in its lower part, spaced notchings 187 defining drain outlets for any moisture that might otherwise collect on the inner side thereof, as readily appreciable by those acquainted with the art. Now it will be understood that by insetting the track rail 186, as described, the associated wheel hanger 55 can be fitted flush in the side edge of the adjoining stiffener 40.

Conveniently below the flooring 49 between the car end and side walls 9, respectively, there is fitted a collecting receptacle 188, of a size to include the bunker 8 when expanded, and serving as discharge means towards the car end for all water and other matter draining from said bunker and the car floor.

Having explained the structure of the various parts comprised in the collapsible bunker 8 of this invention, and assuming said bunker is in the "out of service" position, shown by Fig. 3, with the blower 172 at rest, it will be readily apparent the bulkhead 18 must be first released in order to enable its progression away from the adjacent car end wall 10, as well as swinging the side walls 17 and the grate 20, into ice basket forming location. Initially the arrestor rods 162 are knocked upwards to free the cross arms 161 from retainer engagement between the associated guide member angled ends 151 and confronting inclined stops 158; whereupon the bulkhead 18 is easily movable away from the end wall 10. Before progression of the bulkhead 18 in the direction of the arrow a, associated therewith in Fig. 8, along the tracks 46 and trolley rails 58 by means of the rollers 43, which serve to support the load of the basket or bunker 8 when filled with ice, and the wheels 56, respectively, and the downward angular influence exerted by the cinder deflector 19 as the latter rides over the arcual portions 80 of the runners 79 and clears the inclined edges 75 of the pocket devices 68, aided by concurrent counter-clockwise rocking of the respective locking members 167, it will be apparent that the arrestor rods 162 are manually moved in a vertical direction with resultant advancement of the cross arms 161 along an undulate path, such as typically indicated by the heavy dot-and-dash line marked b in Fig. 8, until they are temporarily restrained in the guide member grooves 157, as conventionally shown by the dot-and-dash indication c in Fig. 7. It is, however, to be particularly noted that, after the bulkhead 18 has reached its limit of movement away from the car end wall 10 into abutment with the trolley track stops 59, the arrestor rods 162 are moved down from their temporary arrested position to effect clockwise return movement of the locking member 167 from the dot-and-dash line indication c in Fig. 7 into the full-line locked position shown therein. This reciprocatory movement of the arrestor rods 162 effects oscillatory angular movements of the locking member 167, relative to the bearer pin 169. The angular movement is obviously of sufficient degree, expandingly considered, to effect release of the respective cross arms 161 from temporary engagement in the grooves 157 for movement of said arms from the dot-and-dash line position c in Fig. 7 to the full-line showing therein; or with said arms 161 in bulkhead arresting position. During the latter part of the angular movement, referred to, the through pin projecting ends 165′ are moved outward beyond the plane of the cinder deflector 19 with the obvious result that, by combined downward movement of the arrestor rods 162 and locking members 167, said ends are easily seated in the pockets 63 of the devices 62, due to riding over the inner faces of the undulate walls 64, whereby the cinder deflector 19 and bulkhead 18 are held in vertical position with the cross arms 161 engaged below the channel stops 159. Particular attention is directed to the fact that the arrestor rods 162 cannot be operated or moved by anyone from within the bunker 8; but that they must be tripped from within the lading space which results in a further safeguard against illicit pilfering, as clearly obvious. Incidentally the leaves of the hinges 135 are normally in spaced relation as viewed in Fig. 7, whereby provision is afforded for a limited degree of angular swing, beyond the vertical position illustrated, so as to positively accommodate the movement of the parts 162, 167 above explained and thereby effectively prevents any arrestive action other than as determined by the cross arms 161, stops 159 and pockets 63. When the bulkhead 18 has been moved to and is arrested in the position of Fig. 2, an operator descends into the car by way of the hatch 6 and swings each side wall 17 on the hinges 28 or 29 outwardly into right-angled relation with respect to the ice basket reticulate wall 12, and as each such side wall approaches its active position, the associated retainer element 32 rides upwardly over the inclined edge 87, of the related latch device 34, until arrested by the confronting edge of the attaching flange 84, with its outwardly angled end 33 in lapping position over the adjoining face of said attaching flange, as clearly understandable on examination of Fig. 6. It is to be noted from Fig. 13 that when the retainer element 32 reaches the upper end of the inclined flange edge 87 it moves onto a seating ledge 87′, serviceable to take all cantilever moments of the screened wall 17 from off the hinges 28, 29, and incidentally prevent its angular swinging away from the bulkhead 18 during expansion of the bunker 8. When both side walls 17 have been swung to, and latched in the active position just explained, the operator consecutively swings the ice grate sections 91 down, from the vertical location of Fig. 3 into the basket bottom forming position of Fig. 2, with entry of the pins 96 into the registrable holes 97 through the horizontal flange of the bulkhead transverse angle bar 82, such action positively interengaging the ice grate 20 with the bulkhead 18 as well as inwardly within the lower flanking parts of the side walls 17, for positive prevention of any movement of the latter when the bunker 8 is in service position. It may be here remarked that, after the operative has lowered one or more of the grate sections 91 he steps from the underlying car flooring 49 onto said lowered section or sections, before lowering the other or remainder of such sections. After the ice grate 20 has been moved into bunker bottom forming position, the operator swings each spacer bar 100 upwardly on its pivot 102 from the pendent location of Fig. 3 to the horizontal one of Fig. 2, with incidental entry of its beveled end 108 medially between the normally and partially lapping taper ends 126', see Fig. 14, of the automatic latching hooks 122, 123. Resultant to the just described entry of the spacer bar beveled end 108 between the latch hooks 122, 123, they are angularly rocked outwards towards the position indicated by the left- and right-hand dot-and-dash lines in Fig. 14, or clockwise and counter-clockwise respectively, until the lower edge of said end 108 passes above the top edges of the respective toe-portions 130, whereupon the hooks 122, 123 counteractively swing inwards, on the common fulcrum member 120, to the full-line position of said figure; whereupon the bar end 108 drops between the toe portions 130 or seats in the lower cut-outs 129, when the opened-up bunker 8 is not only firmly braced for loading with ice but the bulkhead 18 is rigidly secured to resist all thrust exerted by the lading within the car body.

To collapse the bunker 8, the consecutive operations above described with respect to the spacer bars 100, grate sections 91, and side walls 17 are reversed, it being self-evident that, initially, the free end 108 of each bar 100 is slightly raised and the latch hooks 122, 123 angularly separated, by collapsing the finger grips 127 in an obvious manner, to permit lowering of said bars on their pivots 102 into the pendulous position of Fig. 3. It is to be noted that when the grate sections 91 are upwardly folded to inactive position on their respective hinge pins 95' the relatively remote upper edges of the angle-sections 93 abut or lie across the flanking tabs 105, of the brackets 104, whereby all lading thrust exerted against the bulkhead 18 is directly transmitted to the car end posts 16. In addition, when the respective side walls 17 are swung into confronting relation with the end wall 12, the coplanarly-related anglings 25 of the transverse braces 24 abut across the head flanges 101' of the pendent T-section spacer bars 100; while the respective portions of the latching devices 99 extending beyond the plane of the bulkhead reticulate component 21 enter, and pass substantially through, the side wall cut-outs 35 until their flanking flanges 117 approximately engage the spacer bar flanges 101', whereupon the down bends 90 of the stop elements 89 firmly abut the confronting car end posts 16, as hereinbefore mentioned when describing the structure of said parts. Furthermore, it will be understood that, before the bulkhead is moved in the direction of the arrow d, from the position of Fig. 7 to that of Fig. 8, the respective arrestor bars 162 must be moved clockwise, relative to the pivot projections 165', to free the cross arms 161 from engagement below the cinder deflector stops 159, for reverse undulate movement b to that described in connection with the opening up of the bunker 8, and entry of the projection 165' into the bulkhead locking component pockets 63.

Furthermore, it will be readily understood that, when the bunker 8 is in ice-holding or expanded position, as shown in Fig. 2, and the blower 172 is set in operation, ambient air will enter the intake 173 and be forced through the duct 174, elbow 175, flexible extension 178 and duct 180, in the cinder deflector 19, for discharge over and circulation downwardly about the car lading; such air being slightly cooled during initial upward flow and subsequent recirculation through the duct 174 incidental to location of the latter between the car end wall 10 and the reticulate wall 12 of the bunker 8. It is also noteworthy that, when the cinder deflector 19 is in the active position, of Figs. 2 and 7, that it affords effective protection against damage to, or pilfering of, the lading through the hatch 6; whereas, when said deflector 19 is in the location of Fig. 3, it similarly precludes unauthorized access to the lading space of the car, while the plates 140 and apertures 144 afford effective deflection, and drainage means, for any cinders or moisture entering the hatch 6 when the cover 7 is elevated for ventilating the lading space of the car in accordance with known practice. It is also to be remarked that by arranging the slats 145 with the smaller troughings 146 over the larger one 147 that they also serve in the additional capacity of deflector drainage means in direct communication with the upper or outer surface of the plates 140.

From the foregoing it will be appreciated by those acquainted with the art that while one practical embodiment of the invention has been fully explained, in connection with the illustrative drawings, said invention is not limited thereby but is capable of a variety of other mechanical expressions; also that changes may be made in the form, details of construction and arrangement of parts, without departing from the spirit of the specific disclosure. Reference is, accordingly, to be had to the following claims for a definition of the limits of this invention.

Having thus described my invention, I claim:

1. In a refrigerator car, a stationary and opposed relatively foldable means substantially forming three walls of an ice bunker when open; a shiftable bulkhead to form the fourth wall of the bunker; a swingable deflector hinged above and operatively coordinated to the bulkhead; and means for securing the deflector in planar or angular relation with respect to the bulkhead when the latter is respectively extended or collapsed.

2. In a refrigerator car, a stationary and opposingly foldable walls substantially forming three sides of an ice bunker when open; a shiftable bulkhead to form the fourth wall and complete the bunker; a swingable deflector hinged above and operatively coordinated to the bulkhead; means for securing the deflector in planar or angular relation with respect to the bulkhead when the latter is extended or collapsed respectively; and spacers with associated latching means effective to hold the bunker rigid when open.

3. In a refrigerator car, a stationary wall and opposingly foldable walls substantially forming three sides of an ice bunker when open; a shiftable bulkhead to form the fourth wall and complete the bunker; a swingable deflector transversely hinged above and operatively coordinated to the bulkhead; means for securing the deflector in planar or angular relation with respect to the bulkhead when the latter is respectively extended or collapsed; spacers and automatic latching means serviceable to rigidly hold the bunker when extended; means effective to resist lading thrust against the bulkhead; and means effective to firmly restrain the bunker foldable walls and bulkhead, when collapsed, against vibratory displacement.

4. In a refrigerator car, a stationary wall and opposingly foldable walls substantially forming three vertical sides of an ice bunker when open; a shiftable bulkhead to form the fourth wall and complete the bunker; a swingable deflector hinged transversely above and operatively coordinated to the bulkhead; means for securing the deflector in planar or angular relation with respect to the bulkhead when the latter is respectively extended or collapsed; spacers and associated automatic latching means serviceable to rigidly hold the bunker when extended; means effective to firmly hold the bunker foldable means and bulkhead, when collapsed, against vibratory movement; and intake means, said means having an outflow in direct contact with the bunker, operative to circulate and re-circulate cooled air over and downwardly through the car lading space.

5. A collapsible ice bunker comprising a stationary reticulate wall; a grate fulcrumed along one edge of said wall and foldable confrontingly into proximity therewith; opposing side walls similarly attached to the side edges of the stationary wall and swingable into lapping position over the folded grate and said stationary wall; a shiftable bulkhead opposing the stationary wall to complete the bunker; a swingable deflector hinged transversely above and operatively coordinated to the bulkhead; and means for securing the deflector in planar or angular relation with respect to the bulkhead when the ice bunker is open or collapsed respectively.

6. A collapsible ice bunker comprising a stationary reticulate vertical wall; a grate fulcrumed along the lower edge of said wall and upwardly foldable into proximity therewith; side walls similarly attached to the vertical edges of the stationary wall and swingable into lapping position over the folded-up grate and said stationary wall; a shiftable bulkhead opposing the stationary wall to complete the bunker; a swingable deflector hinged transversely above and operatively coordinated to the bulkhead; means for locking the deflector planarly related to the bulkhead, when the latter is in extended position, and inclined thereto when said bulkhead is collapsed; and pivotal spacers with associated latching devices effective to rigidly brace the bunker in service position.

7. A collapsible ice bunker comprising a stationary reticulate vertical wall; a grate fulcrumed along the lower edge of said wall and upwardly foldable into proximity therewith; side walls similarly attached to the vertical edges of the stationary wall and swingable into lapping position over the folded-up grate and said stationary wall; a shiftable bulkhead opposing the stationary wall to complete the bunker; a swingable deflector hinged transversely above and operatively coordinated to the bulkhead; means for locking the deflector planarly related to the bulkhead, when the latter is in extended position, and inclined thereto when said bulkhead is collapsed; spacers pivoted at one end to the stationary wall, with associated automatic locking devices carried by the bulkhead for coaction with the free ends of said spacers to hold the bunker rigid when extended; and means effective to resist all lading thrusts against the bulkhead.

8. A collapsible ice bunker, for refrigerating chambers, comprising a stationary reticulate vertical wall; a grate hinged across the lower edge of said wall and upwardly foldable into proximity therewith; side walls hinged to the vertical edges of the stationary wall and swingable into lapping position over the folded up grate and said stationary wall; a shiftable bulkhead opposing the stationary wall to complete the bunker; bars transversely across the stationary wall and the bulkhead for supporting the hinged grate in approximately horizontal position; a swingable deflector transversely hinged above and coactive with the bulkhead; means for locking the deflector planarly related to the bulkhead, when the latter is in extended position, and inclined thereto when said bulkhead is collapsed; spacers pivoted at one end to the stationary wall; automatic locking devices carried by the bulkhead for coaction with the free ends of the spacers to hold the bunker rigid when extended; means effective to resist lading thrusts against the bulkhead and transmit same directly to the refrigerating chamber end wall; abutment stops effective to firmly arrest the bunker grate, side walls and bulkhead against relative movement when collapsed; and means including an intake device, and an outflow in contact with the bunker stationary wall, operative to circulate and re-circulate air downwardly through the refrigerating space beyond the bulkhead.

9. The combination of claim 8, wherein the grate comprises hinged sections, each such section embodying inner and outer opposedly disposed angle bars with intervening spaced and rigid invert trough-like members seated on the relatively coplanar flanges of said bars; the stationary wall and bulkhead transverse bars for supporting the hinged grate horizontal are of reversely disposed angle-section; and studs carried by the grate section, outer bar coplanar flange, are engageable in holes in the bulkhead angle-section for securement against relative displacement.

10. The combination of claim 8, wherein each hinged side wall is reinforced by diagonal flat strips intermediate spaced transverse channel-section braces, said braces have the flanges unidirectionally bent for coaction with the pivoted spacers when the bunker is collapsed; individual retainer projections from some of the transverse braces remote from the respective hinged edge, each said retainer projection having the free end outwardly angled; and an associated latch device for each retainer projection carried by the bulkhead, said latch device embodying an inclined edge connecting with a seating ledge for the retainer projection when the bunker is in service position.

11. The combination of claim 8, wherein the spacers each consist of a T-section bar pivoted to a channel-section bracket on the bunker stationary wall, the flange portions of said bracket embody lateral tabs for abutment by the outboard edge of the grate when folded up, and the free end of said T-bar flange is removed and the stem formed to define a latching notch with the relatively outer portion thereof beveled for entry into the associated automatic locking device.

12. The combination of claim 8, wherein each spacer locking device comprises an attaching channel-section bracket, an inverted U-section projects medially longitudinal of the bracket web portion, an outboard partial closure wall for the U-section with coplanar flanking flanges therebelow; a stationary fulcrum through the closure wall and bend of the U-section; a notch across the U-section bend and apertures in leg portions thereof; opposingly active latch hooks pendulously supported by the fulcrum with their lower portions tapered and lappingly engaged through the U-section leg portion apertures; and finger grips across the correspondingly tapered upper ends of the hooks above the fulcrum, whereby said hooks can be opened for release of the associated spacer bar from bunker locking engagement therewith.

13. The combination of claim 8, wherein the vertically swingable deflector includes an upper louvred portion and a lower blank section; groove means in said deflector; operatively connected arrestor and locking devices, the latter having lateral projections, housed in the groove means; and pocket devices on the bulkhead for reception of the arrestor lateral projections to lock said bulkhead and swingable deflector together in collapsed or extended position respectively.

14. The combination of claim 8, further characterized in that the stationary reticulate bunker wall is spacedly mounted relative to the car end wall; the intake device is in the form of a rotary fan and the outflow therefrom is of rectangular section, said outflow being snugly located between the reticulate wall and the car end wall; an elbow continuation from the outflow extends over the bunker into proximity with the hinged deflector; and a flexible connection joins said continuation to a rigid duct through the deflector, to accommodate vertical swinging of the latter.

15. A deflector, for collapsible ice bunkers including a movable bulkhead, comprising a cooperative swingable frame transversely divided to provide an upper louvred portion and a lower blank wall section; groove means vertically of the deflector, with opposed stop sections jointly defining a central guideway longitudinally intermediate the ends of said groove means; an oscillatable component fulcrumed at one end within the groove means and having a transverse locking member at the other end, said locking member embodying terminal portions flanking the groove means; an arrestor member operatively coordinated to the locking member, said arrestor member having a cross arm coactive with the stop sections aforesaid; and pocket devices respectively on the top edge and inner face of the bulkhead for engagement therein of the cross arm of the arrestor member, whereby the bulkhead and deflector are locked together in collapsed or extended position.

16. A deflector for collapsible ice bunkers including a movable bulkhead as defined in claim 15, further characterized by vertical runners on one planar face and the top edge of the bulkhead; and arcual portions embodied in said runners having projection beyond the bulkhead top edge for slidable coaction therewith of the deflector as it swings upward and downward.

17. A deflector for collapsible bunkers as defined in claim 15, wherein the vertically swingable frame embodies opposedly directed upper and lower angle-section transverse members and irregular section side components; the groove means consist of spaced channels rigid between the transverse members; an intermediate angle-section subdivides the frame transversely, and plate elements set apart the blank wall section; parallel inclined slats having their longitudinal edges of differential trough-section provide the louvred portion, said slats being rigidly secured between the upper transverse members and the intermediate angle-section; cut-outs in the outboard flange of the frame lower transverse member afford drainage from the deflector; and opposed recesses in the flanges of the spaced channels, with flanking local indentations of the blank wall section plate elements, afford clearance for the terminal portions of the transverse locking member.

18. A deflector for collapsible bunkers, as defined in claim 15, wherein the stop sections of each groove means comprise inwardly projecting flanges from the groove side walls; each said flange including spaced flats aligned along the outer edges of the groove means with an intervening corrugate keeper portion, the wall of said keeper portion defining a transverse hump and a merging groove, and an obtuse-angled transverse continuation of each inward flange extends to the bottom of the groove; transverse inclined stops, project inward and outward from one of the flange flats and the bottom of the groove means respectively, and said inclined stops, in conjunction with the obtuse-angled ends, jointly define undulate progression for the arrestor member cross arm, whereby the latter is caused to engage in the respective pocket devices on the movable bulkhead.

19. The combination of claim 15, wherein each pocket device embodies a flange for attachment to the bulkhead, and the arm receiving portions whereof are defined by spaced undulate coplanar walls with outwardly related side walls having inclined edges.

WARREN R. ELSEY.